United States Patent Office 3,784,680
Patented Jan. 8, 1974

3,784,680
CYCLICAL PROCESS FOR RECOVERY OF ELEMENTAL SULFUR FROM WASTE GASES
Herbert W. Strong, Shaker Heights, Jerrold E. Radway, Westlake, and Henry A. Cook, Fremont, Ohio, assignors to Basic Incorporated, Cleveland, Ohio
Filed Dec. 1, 1971, Ser. No. 203,772
Int. Cl. C01b 17/04
U.S. Cl. 423—571
4 Claims

ABSTRACT OF THE DISCLOSURE

A process for removing sulfur dioxide ($SO_2$) from gases and recovering elemental sulfur comprising scrubbing the gases with a slurry containing a metal sulfide under conditions to react the sulfur dioxide with the sulfide to form a precipitate which is predominantly metal sulfite and elemental sulfur. A portion of the slurry is withdrawn and the precipitate is separated therefrom. The remaining slurry is recycled for reaction with additional sulfur dioxide and the precipitate is heated under conditions to remove water therefrom and convert any metal thiosulfate therein to additional sulfite and elemental sulfur. Some metal sulfate may be present. The elemental sulfur is separated, and the sulfite and sulfate are then reduced to the sulfide which is recycled to the scrubbing slurry. Preferably, the metal sulfide is an alkali sulfide or alkaline earth sulfide.

DESCRIPTION

Figure 1:
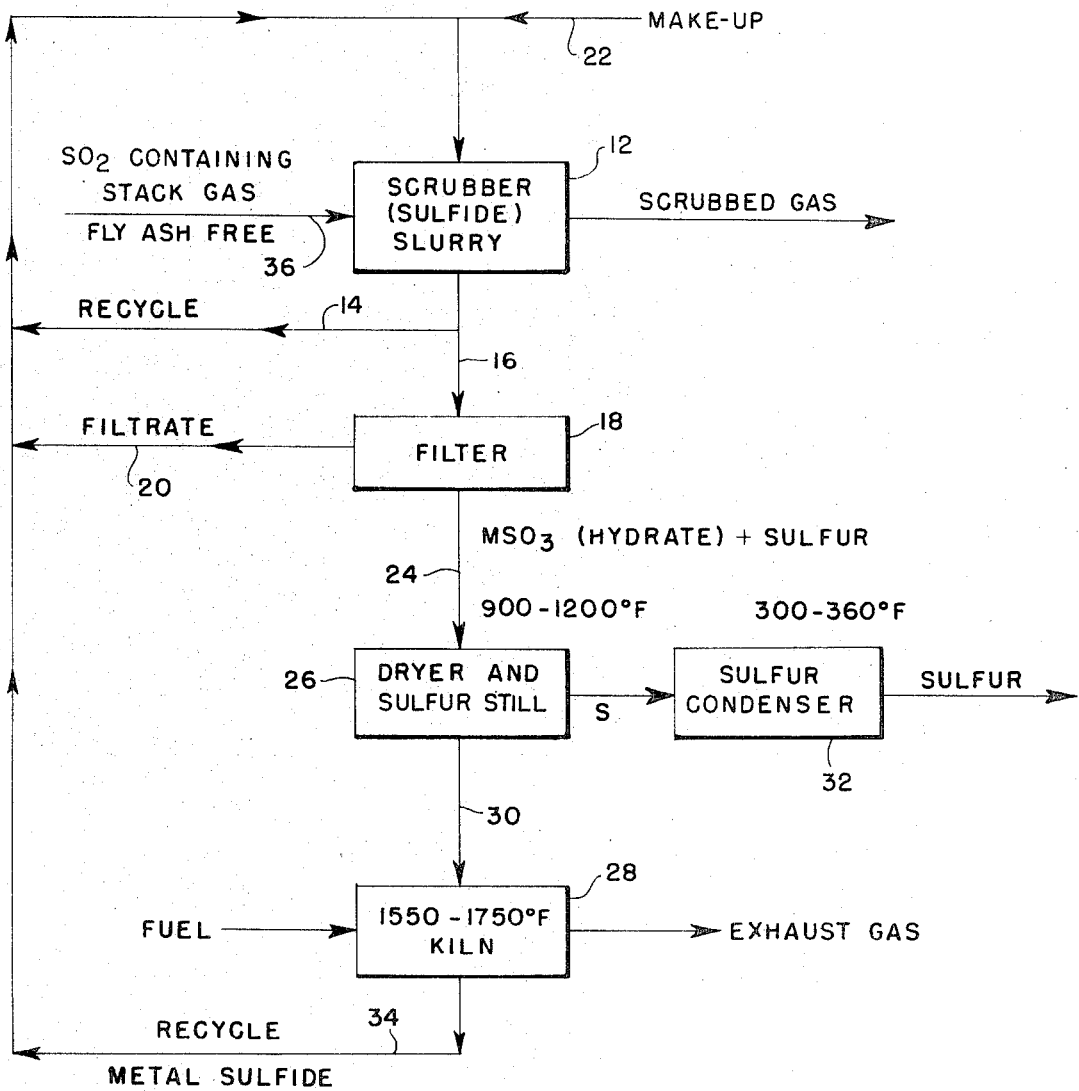

The present invention relates to an improved process for removing sulfur dioxide from gases having a relatively low concentration of $SO_2$, and particularly to a sulfur dioxide absorption process using a metal sulfide aqueous slurry in which elemental sulfur is recovered from the process.

For purposes of the present application, the invention will be described with reference to removing sulfur dioxide from combustion gases, although it will become apparent that the invention also is applicable to removing sulfur dioxide from other gases.

It is well known that hydrogen sulfide and sulfur dioxide react to form elemental sulfur, and in fact this process is used in the elimination and recovery of sulfide sulfur from sour gases in the Rocky Mountain Area of the United States and Canada. The reaction is:

$$2H_2S + SO_2 = 2H_2O + 3S$$

The sour gases after intermediate treatment have a relatively high concentration of hydrogen sulfide making use of the reaction feasible. However, even after use of this reaction (the Claus reaction), the "cleaned" flue gases will still have an amount of sulfur, sulfur dioxide, and sulfide equivalent to 15,000 parts per million of sulfur dioxide. Thus, the "cleaned" gases have $SO_2$ concentrations far in excess of those typically emitted in the combustion gases from a power plant, about 1,500–2,500 parts per million. Obviously, since the $SO_2$ concentrations in the waste stream from the Claus process are at orders of magnitude higher than those in the streams to be treated using the process, it has no application for low sulfur combustion gases.

Wet scrubbers for the removal of sulfur dioxide are known. These may employ a grid packed tower and a continuously circulated solution made alkaline by addition of an agent such as chalk or lime. They have the advantage that $SO_2$ can be extracted from dilute concentrations of combustion gases with reasonably sized equipment. Calcium sulfite ($CaSO_3$) forms first but the process has the disadvantage that some of the sulfite is oxidized to calcium sulfate ($CaSO_4$). The solution in the scrubber becomes supersaturated with respect to calcium sulfate which deposits and clogs the scrubber. As a result, maintenance and labor costs are high, and the wet sulfate sludge creates a somewhat troublesome disposal problem. British Pat. No. 406,972, by Dr. Rostin, also reports that where lime has been used for desulfurizing gases, the methods are for the most part too expensive because the calcium-sulfur compounds cannot easily be regenerated into a form in which they are capable of taking up sulfur again.

Toward producing a marketable sulfur compound, it has been proposed to utilize the sulfur dioxide of sulfur containing gases for the production of sulfuric acid. Several sulfuric acid processes have been developed, but the market for sulfuric acid produced from furnace gases is limited geographically, and only a very small proportion of the total available sulfur dioxide may be utilized in this manner because of transportation costs (notice U.S. Pat. No. 1,967,265, Rosenstein et al.).

Accordingly, it is a principal object of the present invention to provide a process for the effective removal of sulfur dioxide from combustion gases and other gases having a low concentration thereof, and for the recovery of elemental sulfur from the gases.

A further object of the present invention is to provide a process for desulfurizing gases in which sulfur compounds are produced which can be economically regenerated to a form capable of taking up sulfur again.

Another object of the present invention is to provide an improved wet-scrubber process for the removal of sulfur dioxide from gases and production of a marketable sulfur in which presently employed or available wet-scrubbing equipment can be employed with little or no modification.

A still further object of the present invention is to provide a cyclic process for the removal of sulfur dioxide from combustion gases, and reduction of the same to elemental sulfur, suitable for use with a steam generating power plant.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

Figure 2:
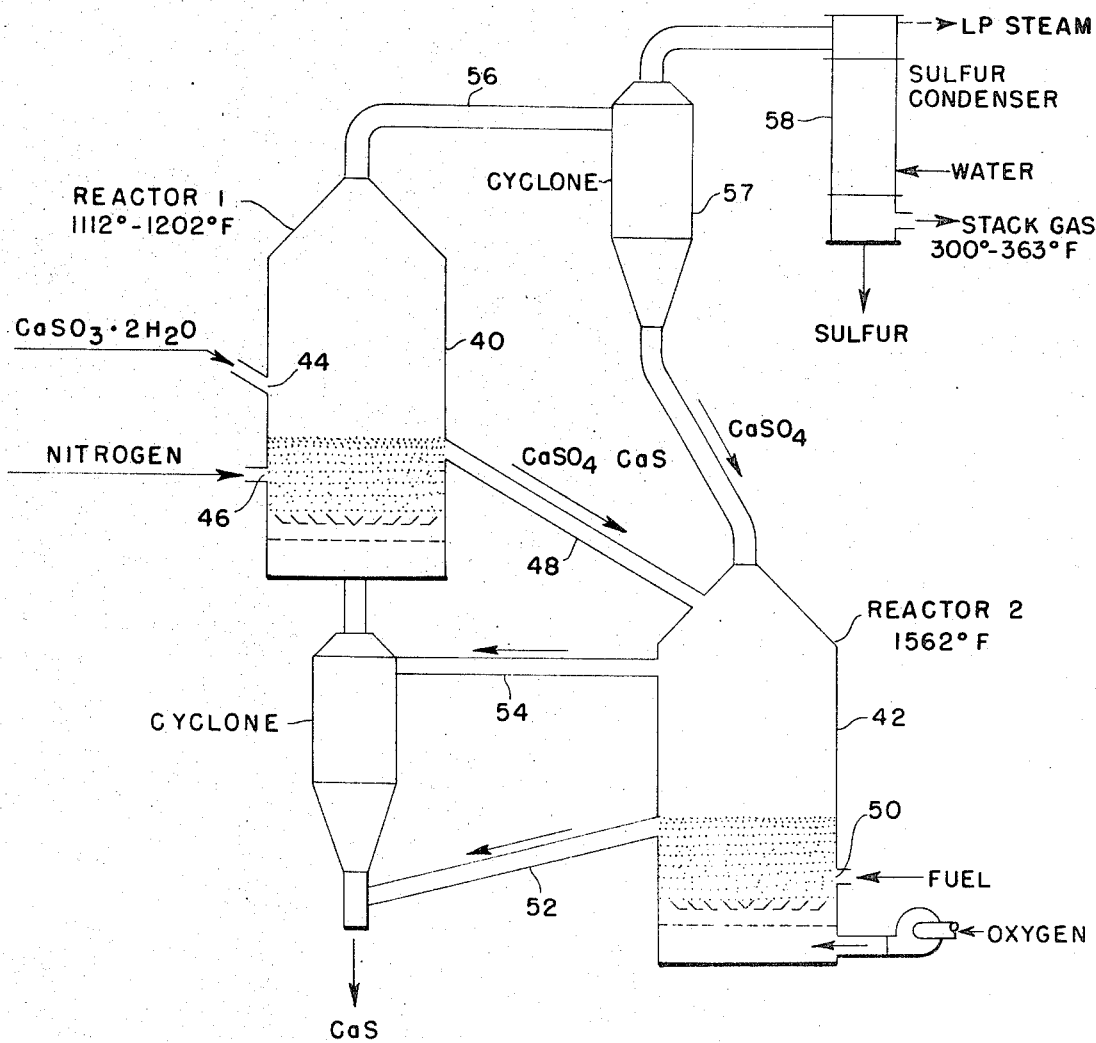

FIG. 1 is a flow diagram illustrating a process for the recovery of sulfur from combustion gases in accordance with the concepts of the present invention; and FIG. 2 is a schematic elevation view of a reactor system for use in the process of FIG. 1.

In the practice of the present invention, referring to FIG. 1, combustion gases to be treated are introduced into a conventional scrubber 12, such as a venturi-type scrubber, by which they are brought into intimate contact with a scrubbing slurry. The gas stream can be the effluent from oil, gas or coal fired power plants, from sulfuric acid plants, metallurgical plants, or any plant discharging a gas containing sulfur oxides. However, the present invention is primarily useful in the removal of sulfur dioxide from combination gases in which the sulfur dioxide content is relatively low, on the order of less than 2–3 percent. A gas containing more than about four percent sulfur dioxide can be used directly in the manufacture of sulfuric acid. The gas stream should be substantially ash-free.

In most instances of application of the present invention, the gas composition would be approximately:

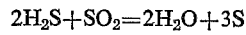

| | Percent |
|---|---|
| $SO_2$ | 0.10–0.50 |
| $CO_2$ | About 12 |
| $O_2$ | 0–5 |
| $N_2$, $H_2O$, etc. | Remainder |

The scrubbing slurry is a suspension of an acid soluble metal sulfide which may be saturated or nearly saturated with metal thiosulfate. The sulfides can be alkali sulfides such as sodium, potassium and lithium sulfide, alkaline earth sulfides such as calcium, strontium, magnesium and barium, and other metal sulfides such as iron sulfide, zinc sulfide and aluminum sulfide. Calcium sulfide because of its reactivity, availability and economic advantages is preferred.

Whereas, for purposes of the present application, the scrubbing medium is referred to herein as a slurry, it is understood that the medium can be a fully saturated solution, less than fully saturated, or a solution containing some precipitate. It is also understood that the terms "filter" and "filtering" employed hereinafter in this application denote any means of solid-liquid separation.

The scrubbing slurry is continuously recirculated to the wet scrubber through line 14 and brought into intimate contact with the combustion gas flow. Sulfur dioxide ($SO_2$) is absorbed in the scrubbing slurry and reacts with the metal sulfide to form sulfite, additional thiosulfate, some sulfate (depending upon the amount of oxygen in the combustion gas) and elemental sulfur. The generalized overall reaction for the scrubbing process may be as follows:

(1)  $MS + SO_2 + xH_2O \rightarrow MSO_3 \cdot xH_2O + S$ where MS is a metal sulfide of the group listed above. No attempt has been made to balance Equation 1 (or subsequent generalized equations), as the valences for the metals of the listed sulfides are different, and also different metal sulfites ($MSO_3$) have different waters of hydration.

As the reaction proceeds, additional solids product is formed in the slurry, primarily metal sulfite $$(MSO_3 \cdot xH_2O)$$

and elemental sulfur. A portion of the slurry is then drawn off in line 16 and advanced to filter 18 in which insoluble sulfur (S), metal sulfite (and other insolubles in the solids product) are separated from the filtrate. The latter is returned to the scrubber in line 20 along with the recycle flow of line 14. Makeup flow may be added to the scrubber in line 22 in the form of water and additional sulfide to maintain the flow of the slurry in the scrubber constant, and also to maintain the concentration of sulfide in the slurry.

For purposes of the present application, the term precipitate when employed is in reference to the soilds product separated from the filtrate in filter 18.

With the respect to the scrubbing step, it was indicated above that the scrubbing slurry may be saturated with metal thiosulfate. Experience has indicated that the following generalized reaction may occur.

(2)  $MS + SO_2 \rightarrow MS_2O_3 + S$ to form the metal thiosulfate ($MS_2O_3$) if the slurry is not saturated or nearly saturated with the thiosulfate. In other words, if the slurry initially is not saturated or nearly saturated, it will shortly become so. At that point, the metal thiosulfate which may form either precipitates or reacts according to the reaction.

(3)  $MS_2O_3 + xH_2O \rightarrow MSO_3 \cdot xH_2O + S$ to form additional sulfite and sulfur.

Another reaction which may occur in the wet scrubber is the reaction of metal sulfide with sulfur dioxide, in the presence of oxygen, to form the metal sulfate $$(MSO_4 \cdot xH_2O)$$

according to the following equation:

(4)  $MS + SO_2 + O_2 + xH_2O \rightarrow MSO_4 \cdot xH_2O + S$

Normally, the amount of metal sulfate formed will be relatively small.

It is possible for some metal bisulfite [$M(HSO_3)_2$] to form. The bisulfite is more soluble than the sulfite, and its presence in the scrubbing slurry by itself is not harmful. However, the bisulfite forms only when the pH of the solution is relatively low, and at such pH, there is an insufficient absorption of sulfur dioxide in the slurry, and excessive sulfur dioxide may pass through the slurry to atmosphere. A primary goal of the scrubbing operation is obtaining the maximum removal of sulfur dioxide consistent with reasonable scrubbing conditions. Sulfur dioxide removal can be increased by increasing the solids content of the scrubbing slurry, by increasing the slurry to gas ratio in the scrubber, by increasing the pressure drop across the scrubber, and by raising the pH. Accordingly, there is no specific lower pH limit, although as a general rule, the pH should be above about 3.5 for optimum sulfur dioxide absorption. At a pH of about 3.5 or above, a minimum amount of metal bisulfite is formed, so that the reaction of the metal sulfide with sulfur dioxide to this compound need not be considered.

Accordingly, the precipitate or solids product separated from the slurry, in addition to metal sulfite and elemental sulfur, from reaction (1), may contain some metal thiosulfate from reaction (2), additional sulfur from reactions (2) and (3), and some metal sulfate, from reaction (4).

If the pH of the scrubbing slurry is too high, above about six, the metal sulfide may not react completely, and some may appear in the solids product or precipitate separated in the filtering step. This in itself does no particular harm, but in subsequent processing steps, which include drying and calcining, the cost of such steps will be increased somewhat, for no advantage. Accordingly, the pH of the scrubbing slurry should be maintained below about 6.0, preferably below about 5.0.

To summarize, for optimum efficiency of sulfur dioxide removal from combustion gases and efficiency of drying and calcining (to be subsequently described), a preferred pH range is between about 3.0 and about 5.0, optimum being between about 3.5 and about 4.5. With the preferred range, a scrubbing efficiency of 90% is readily attainable, and by close control of pH, efficiencies of 95% and above can be expected.

Normally, the scrubbing slurry will reach an equilibrium temperature between about 50° F. and about 200° F. depending upon conditions in the generator. However, practically, the temperature will range between about 140° F. and about 180° F. A number of factors influence the operating temperature. One factor is the saturation or moisture content of the combustion gases entering the scrubber. The gases become fully saturated in the scrubber cooling the scrubbing slurry by evaporation. Another factor is the temperature of the incoming combustion gases to the scrubber which is normally about 300° F. If desired, a heat exchanger can be employed to cool the incoming gases while simultaneously heating the exit gases from the scrubber. This has the advantage that less water from the scrubber will be evaporated reducing condensation and plume from the generator stack. At the same time the stack gases are made sufficiently hot to provide the driving force necessary for carrying the gases out of the stack. Also the gases leaving the scrubber can be heated by hot waste gases (from the calcining and drying steps to be described) to give a gas temperature high enough to cause the gas to discharge from the stack. Different plant circumstances clearly can alter the scrubbing temperature, but a temperature range from about 140° F. to about 180° F. should cover most circumstances.

Following filtration, the removed solids or precipitate in line 24 (primarily metal sulfite and sulfur) are dehydrated in dryer 26, which is maintained at a temperature sufficiently high to remove free water and water of hydration. This is carried out to the maximum extent feasible, for instance to one-half mole or less water of hydration ($MSO_3 \cdot \frac{1}{2}H_2O$).

Preferably, the dehydration step is carried out at a sufficiently high temperature to distill the elemental sulfur from the precipitate which is then recovered in a sulfur condenser 32. Sulfur could be removed from the sulfite by other means, such as solvent extraction or flotation, but removal by distillation has the advantage that drying and dehydration of the sulfite and separation and recovery of sulfur are all carried out in one step. Also dehydration need not necessarily be carried out in dryer 26, although it is conveniently achieved at this point.

The dehydration step also has the effect of reducing any metal thiosulfate to the desired metal sulfite and additional elemental sulfur, according to the following reaction:

(5) $MS_2O_3 + xH_2O \rightarrow MSO_3 \cdot xH_2O + S$

Accordingly, following dehydration, the solids product is primarily the sulfite, sulfur and some sulfate, from reaction (4).

The dehydrated solids are transmitted to recover plant 28 via line 30 for high temperature reduction of the solids to the metal sulfide. This is accomplished according to the following equation:

(6) $MSO_3 + C \rightarrow MS + CO_2$

The sulfide obtained by calcination (high temperature reduction) of the sulfite is then recycled in line 34 to the wet scrubber to complete the cycle.

The calcination or high temperature reduction step also has the effect of reducing the metal sulfate to the corresponding sulfide as follows:

(7) $MSO_4 + C \rightarrow MS + CO_2$

In general, carbonates, oxides or hydroxides of the corresponding metal sulfides, depending upon cost and availability, may be used as make-up in line 22 to replace metal ions lost from the system. The oxides and hydroxides are added directly to the scrubber. The carbonates also could be added to the scrubber, in line 22, but would not react completely during the first cycle, unless an active grade is employed. Preferably, make-up carbonate is added at line 30 prior to calcining the sulfite or sulfate back to the sulfide, in which case the metal oxide of the carbonate is cycled to the scrubber with the recycled sulfide.

Additional aspects of the present invention will be apparent from the following examples.

EXAMPLE I

Twelve grams of calcium sulfide (91.8% pure calcium sulfide was employed so that the actual amount of pure CaS was 11.02 grams) were added to 150 ml. of water, to which sulfur dioxide also was added, at a rate to maintain the pH at about 5.0. The experiment was started at room temperature, but reached a temperature of 106° F. from the heat of the reaction. At the finish of saturation, a small amount of calcium oxide was added to precipitate any calcium bisulfite [Ca(HSO₃)₂] that may have formed. This raised the pH to 6.0.

Since no sulfite or thiosulfate was in the water at the start of the experiment, a portion of the calcining sulfide added to the water was used up in forming the soluble products of these compounds and sulfur. This experiment therefore was not intended to simulate actual scrubbing conditions. Had a fully saturated solution been employed, then all of the calcium sulfide would have gone into the production of insoluble product.

The solids obtained from the experiment were filtered from the liquid and dried (dehydrated) at 215° F. The dried solids or precipitate weighed 15.25 grams. In addition, the filtrate was evaporated and dried (dehydrated) at 215° F., the recovered solids weighing 10.50 grams. In the drying (dehydration) steps, whatever thiosulfate was in the filtrate or precipitate was converted to sulfite and additional sulfur. Accordingly, the overall reaction which took place in the experiment was believed to be:

(8) $2CaS + 3SO_2 \rightarrow 2CaSO_3 + 3S$ similar to reaction (1), minus water of hydration as the product was dehydrated.

Elemental sulfur was extracted from the filtrate and precipitate samples with carbon disulfide. The amount of elemental sulfur recovered is given in the following Table I:

TABLE I

| | Elemental sulfur, weight-grams |
|---|---|
| Solids product | 5.32 |
| Filtrate | 1.94 |
| Total | 7.26 |

The theoretical yield from 11.02 grams of pure calcium sulfide based on reaction (8), wherein 2 moles sulfide gives 3 moles sulfur, is 7.32 grams. Accordingly, the yield of 7.26 grams of Table I represents a 99% recovery.

EXAMPLE II

A second scrubbing experiment was conducted by bubbling a mixture of 0.5% SO₂, 10% CO₂ and 89.5% air through a scrubbing liquid in a beaker. The liquid was continuously circulated by means of a small pump, and 250 ml. of water were used. A mixture of 50 grams calcium sulfide and 3.65 grams calcium carbonate (to stimulate the use of CaCO₃ as make-up) was added at a rate to keep the pH between 2.9 and 3.6, as determined with a pH meter. The temperature was kept between 160° F. and 170° F. Samples were taken periodically, filtered, and the solids (precipitate and sulfur) were dried at 266° F. The filtrates were tested, qualitatively, for bisulfite [Ca(HSO₃)₂] by the addition of lime solution and for thiosulfate by the addition of HCl. At a pH of 3.0, a small amount of bisulfite [Ca(HSO₃)₂] was present but at a pH of 3.55 none was detected. All filtrate samples gave strong tests for thiosulfate, evidence that the following intermediate reaction, corresponding to reaction (2), probably occurs;

(9) $2CaS + 3SO_2 \rightarrow 2CaS_2O_3 + S$

The samples of dried solids (precipitate and sulfur), after removal of sulfur by carbon disulfide extraction, were checked by X-ray diffraction and were found to be mixtures of CaSO₃·½H₂O and CaSO₄ with traces of CaS, evidence that the metal thiosulfate either reacts or is broken down by the heat of drying according to the following equation, corresponding to Equations 3 and 5;

(10) $2CaS_2O_3 + 2H_2O \rightleftharpoons 2CaSO_3 \cdot H_2O + 2S$

Whether the water of hydration is one (1) mole or less depends upon the degree of drying effected. The reaction to calcium sulfate corresponding to Equation 4, probably is as follows:

(11) $2CaS + 3SO_2 + O_2 + 4H_2O \rightarrow 2CaSO_4 \cdot 2H_2O + 3S$

In the above experiment, no presence of hydrogen sulfide (H₂S) in the scrubbed gas was noted. In addition, substantially complete absorption of the sulfur dioxide was experienced.

Another experiment which involved a two step process of drying a sample and then removing the sulfur by distillation or solvent extraction (such as with carbon disulfide) illustrated aspects of the drying step. Hydrated calcium sulfite (CaSO₃·2H₂O) loses its water of hydration at about 212° F., which loss is very rapid at about 350° F. However, at this temperature, it was found that the sulfur sublimed completely in a drying oven in two days' time, even though sulfur does not distill rapidly until near its boiling point of 835° F. To keep retention time in the dryer low and to reduce loss of sulfur, a preferred operating temperature of about 350° F.–400° F. should be employed. However, even with a short retention time in the dryer and relatively low operating temperature, some sulfur may be volatilized. In the drying step, a neutral atmosphere is desired. A suitable piece of equipment is a fluid bed dryer.

EXAMPLE III

This example is concerned with reduction of sulfite to sulfide for recycle of the latter. The desired reactions, corresponding to reactions (6) and (7) above, are

(12) $\quad 2CaSO_3 + 3C \rightarrow 2CaS + 3CO_2$

(13) $\quad CaSO_4 + 2C \rightarrow CaS + 2CO_2$

An addition of 0.15 gram of carbon was intimately mixed with 1.00 gram technical grade calcium sulfite ($CaSO_3 \cdot 2H_2O$), which contained the stoichiometric equivalent of 0.784 gram $CaSO_3$. The sample was placed in a boat which was placed in the cool end of a tube furnace. The furnace was thoroughly purged by passing nitrogen gas from a cylinder through the furnace. The gas flow was stopped and the boat was moved into the hot zone of the furnace, which was heated to the temperatures indicated in the following Tables 2 and 3. After 25 minutes the nitrogen gas was turned on at a rate of .5 liters per minute for 5 minutes. The sample was then removed, cooled in a desiccator and weighed. Four samples were run at the four different temperatures by this procedure and analyzed. The following results were obtained:

TABLE 2

| Furnace temp., °F. | Calcined weight, grams | Chemical analysis, weight percent | | | |
|---|---|---|---|---|---|
| | | Carbon | $CaSO_4$ | CaS | $CaSO_3$ |
| 1,520 | .8605 | 10.7 | 54.2 | 24.5 | [1] 10.6 |
| 1,600 | .7631 | 6.72 | 44.8 | 38.7 | [1] 9.78 |
| 1,690 | .7462 | 5.48 | 44.4 | 42.0 | [1] 8.12 |
| 1,830 | .6835 | 2.20 | 38.9 | 48.5 | [1] 10.4 |

[1] By difference.

TABLE 3

| | Temperature, °F. | | | |
|---|---|---|---|---|
| | 1,520 | 1,600 | 1,690 | 1,830 |
| Calcine, grams | .8605 | .7631 | .7462 | .6835 |
| Carbon remaining, grams | .0920 | .0512 | .0408 | .0150 |
| $CaSO_4$, grams | .4670 | .3420 | .3310 | .2660 |
| CaS, grams | .2110 | .2950 | .3140 | .3320 |
| Calculated percent of reacted $CaSO_3$ converted to CaS | 46 | 62 | 64 | 70 |
| Calculated percent of reacted $CaSO_3$ converted to $CaSO_4$ | 54 | 38 | 36 | 30 |

Table 2 establishes that even at the relatively low temperature of 1520° F., substantial reduction of the calcium sulfite ($CaSO_3$) to sulfide occurred. However, the tables show that as the temperature of calcination increases, the ratio of calcium sulfate to calcium sulfide decreases and the recovery of calcium sulfide increases. Based on the above, for optimum recovery of calcium sulfide, temperatures in excess of 1800° F. would appear to be preferred, although evidence exists that depending upon the equipment employed, satisfactory conversion to the sulfide can be obtained with temperatures less than 1600° F.

In this respect, when $CaSO_3$ is heated to 450° C. (842° F.), it reacts by disproportionation to give $CaS + CaSO_4$ in the proportion of one mole CaS to 3 moles $CaSO_4$ (Kirk-Othmer, Encyclopedia of Chemical Technology, 1st edition vol. 2, p. 780). However up to 98% conversion of the sulfate ($CaSO_4$) to sulfide (CaS) at 850° C. (1562° F.) in a fluidized bed reaction has been reported. (Dorr-Oliver Technical Reprint No. 2323, pp. 3 and 4, May 21, 22, 1968) so that the overall or net reaction should be (12) above.

EXAMPLE IV

The following example, with reference to FIG. 1, illustrates a preferred mode of operation of the invention employing a calcium sulfide (CaS) scrubbing solution. In this example, the furnace gases scrubbed are from an oil fired steam power generator and are introduced into the scrubber 12 via duct 36 at a rate to pass 100 tons per day sulfur dioxide ($SO_2$) through the scrubber. By means of a simple water scrubber upstream of the stack scrubber 12, the stack gases are substantially free of flyash. An analysis of the gas is as follows: about 10% carbon dioxide ($CO_2$), about 0.5% sulfur dioxide ($SO_2$), about 0.2% water vapor ($H_2O$), and the remainder nitrogen and residual oxygen. The flow of slurry in the scrubber is at the rate of about 24,869 tons per day, and the slurry and stack gases are brought into intimate contact within the scrubber. The scrubber has an efficiency of more than 90%, so that less than 10 tons per day sulfur dioxide is lost to atmosphere.

The pH of the scrubber slurry is maintained between about 3.5 and about 4.5 by the controlled additions of calcium sulfide and/or oxide as necessary. The temperature of the slurry, from the hot gas, is between 140-175° F. In the scrubber, the sulfur dioxide reacts with calcium sulfide to form calcium sulfite, sulfur and some calcium thiosulfate according to Equations 8 and 9. Some calcium sulfate also may be formed according to Equation 11.

The slurry in the scrubber is continuously recirculated in line 14 for contact with additional stack gas. The recirculation rate is on the order of ten gallons per thousand cubic feet of gas. The solids concentration in the slurry varies between about 0.8 and 1.2 pounds per gallon. A portion of the slurry is withdrawn from the recirculated flow, in line 16, about 10% of the amount recirculated. On the basis of a water balance, about 1500 tons per day of free water is withdrawn from 15,550 tons of water recirculated per day.

The portion of the scrubbing solution which is withdrawn in line 16 is then subjected to filtering or centrifuging (at 18) to remove elemental sulfur and precipitated calcium sulfite. The filtrate is recycled to the wet scrubber in line 20. The ratio of solids (precipitate including sulfur) to filtrate is about 278 tons per day to 1486 tons per day, the solids analyzing as follows:

TABLE 4

| | Tons |
|---|---|
| $CaSO_3 \cdot 2H_2O$ | [1] 219.5 |
| Sulfur | 45.0 |
| Free water | 13.9 |

[1] This value includes any sulfate and thiosulfate formed, and 50.6 tons water of hydration, in addition to sulfite.

A mechanical conveyor type centrifuge preferably is employed in the filtering step since it gives a very dry cake and benefits from not having to provide a clear solution. A clear solution is not necessary, since large quantities of sludge are recirculated to the scrubber anyway in line 14. However, it is desirable to obtain as dry a solids product as possible to keep subsequent drying requirements to a minimum.

A number of other commercial units may be employed, for instance continuous or batch type centrifuges, continuous rotary drum or continuous rotary disk vacuum filters, and continuous rotary drum pressure filters or pressure filters of the Vallez type.

Whereas, the centrifuge receives the slurry directly as it comes from the scrubber, it would be preferable first to employ a thickener to concentrate the solids by gravity settling if a filter is employed.

Following filtering or centrifuging, the precipitate comprising sulfur and other solids is fed to a reactor complex illustrated in detail in FIG. 2. The reactor complex performs all of the functions of the dryer and sulfur still (26, FIG. 1), sulfur condenser (32, FIG. 1) and kiln (28, FIG. 1), and consists primarily of two reactors 40 and 42 (FIG. 2). The solids from the filter (sulfur, sulfite, and any thiosulfate and sulfate formed) are first introduced into reactor 40 via port 44. This reactor is maintained at a temperature of about 1112° F., sufficient to dry the precipitate, dehydrate the calcium sulfite ($CaSO_3 \cdot 2H_2O$)

and sulfate and convert most of the calcium sulfite into the sulfate and sulfide (by disproportionation), and also to volatilize the sulfur. Any calcium thiosulfate in the precipitate is also converted to calcium sulfite and sulfur in the reactor. A substantially neutral atmosphere is employed in the reactor by introducing nitrogen into the reactor in port 46. The nitrogen may be obtained from the production of oxygen, and in addition to diluting the gases, controls the temperature in the reactor. Reactions which may be followed include (10) (above) and also the following dehydration reactions:

(14) $\quad CaSO_3 \cdot 2H_2O \rightarrow CaSO_3 + 2H_2O$

(15) $\quad CaSO_4 \cdot 2H_2O \rightarrow CaSO_4 + 2H_2O$

As illustrated in FIG. 2, a bed of the solid is maintained in the reactor 40. This bed is allowed to flow over into duct 48 by which, following initial heating and reaction, the solids are transmitted to the second reactor 42. The second reactor is maintained at a higher temperature, about 1562° F. The purpose of this reactor is primarily to convert the remaining calcium sulfite and calcium sulfate ($CaSO_4$) in the solids to sulfide according to reactions (12) and (13) above. A temperature in excess of about 2150° F. is not desired, since the calcium sulfide then would react with the calcium sulfate to give sulfur dioxide according to the equation.

(16) $\quad 3CaSO_4 + CaS \rightarrow 4CaO + 4SO_2$

The amount of oxygen employed in the second reactor is controlled to give the required reducing condition. Oxygen is used rather than air because the reduced gas volume lowers equipment and operating cost. Nitrogen for the first reactor may be obtained from the oxygen plant used to produce the oxygen for the second reactor.

The heat for both reactors is obtained by burning fuel introduced through port 50 in the second reactor. As with the first reactor, a bed of solids is maintained in the second reactor which is allowed to flow over into duct 52 for recovery of CaS. The high temperature gaseous effluent from the second reactor, which is transmitted to the first reactor by connecting duct 54, comprises mostly carbon dioxide with a small amount of carbon monoxide and some unburned hydrocarbons. A small amount of oxygen may be added to the first reactor for the combustion of the hydrocarbons (unburned from the second reactor) and to give a neutral atmosphere.

The effluent from both reactors, primarily vapors and gases, is transmitted in duct 56 to a conventional cyclone separator 57 where particulate matter (mainly calcium sulfate) is separated and returned to the second reactor. The remaining vapors and gases are then transmitted to a sulfur condenser 58 wherein sulfur is removed from the gases. The latter, being essentially sulfur free are transmitted to atmosphere, the sulfur condenser also producing low pressure steam.

In the sulfur condenser, the gas stream from the reactor 40 must be cooled to liquefy as much of the sulfur as feasible at a 363° F. outlet temperature for the stack gases. The vapor pressure of the sulfur is only 1 mm. of Hg so that losses due to uncondensed sulfur amount to only about .13% of the weight of the non-condensible gases in the stack. The temperature of 363° F. is sufficiently high to develop steam at considerable pressure. The temperature could be reduced still further, thereby further reducing sulfur losses, and still develop low pressure steam. A suitable lower temperature limit for the sulfur condenser is about 300° F. Losses can also be reduced in the condenser by reducing the amount of gases other than sulfur passing through the reactors 40 and 42. This is another benefit of employing oxygen instead of air, as a lower volume of gas is employed.

In this example, the efficiency of the reactor and condenser are such that 40.5 tons per day of sulfur is obtained, representing a 90% recovery of the sulfur in the precipitate containing solids filtered from the portion of the slurry withdrawn from the scrubber. Sulfur lost in the sulfur condenser amounts to 2.25 tons per day, less than 5%. About 96.2 tons per day calcium sulfide are obtained from the second reactor which can be recycled to the scrubber constituting more than approximately 95% recovery of the scrubbing additive, and requiring only 3.94 tons per day of calcium oxide make-up.

The scrubber slurry temperature of 170–175° F., with a pH of 3.5–4.5, results in a loss of only about 5175 tons of water per day (80% saturated gas at 175° F.), about 30% of the amount of water recycled in the scrubber. This requires a make-up of only 4834 tons of water per day, taking into consideration the water contained in the stack gases entering the scrubber.

It was mentioned in this example that the preferred concentration of solids in the slurry leaving the scrubber is about 0.8–1.2 pounds per gallon. A much wider range can be used satisfactorily. However, in operation the concentration of solids in the slurry is kept relatively constant. This is accomplished by the removal of solids in the filter or centrifuge 18.

Although a venturi type scrubber was employed in connection with the above example, other types of scrubbers could be used, such as a Turbulent Contact Absorber (trademark, Universal Oil Products, Air Correction Division) using glass beads or hollow plastic spheres. This is a cylinder containing a bed of such spheres which fill approximately 20% of the space between two restraining plates. Two of these beds in series are usually employed and the gas flows upward, liquid or slurry flow being downward through the bed. The spheres are buoyed by the gas stream whose velocity must be kept at a rate that will result in the spheres constant motion. The velocity is great enough to lift the spheres off the lower plate but not great enough to keep them against the upper plate.

EXAMPLE V

The scrubbing and filtering steps are conducted as in Example IV, however, instead of treating the precipitate-sulfur solids in a single step, the same is first heat treated at about 266° F. to convert any contained calcium thiosulfate therein to calcium sulfite and elemental sulfur according to the following equation:

$$2CaS_2O_3 + xH_2O \xrightarrow{266°F} 2CaSO_3 \cdot \tfrac{1}{2}xH_2O + 2S$$

Heating at the above temperature produces a calcium sulfite with only ½ mole of water of hydration or less. A lower temperature could be employed to convert thiosulfate to sulfite with lesser reduction of free water and water of hydration.

Recovery of elemental sulfur is then accomplished by carbon disulfide ($CS_2$) extraction, and the residue containing calcium sulfite is reduced in a rotary kiln by the addition of carbon at sufficient temperature to calcine the calcium sulfite to produce calcium sulfide and carbon dioxide according to the following equation:

(18)

$$2CaSO_3 \cdot xH_2O + 3C \xrightarrow{ca.\ 1600°F.} 2CaS + 3CO_2 + 2xH_2O$$

The sulfide is then recycled to the wet scrubber, as shown in FIG. 1, and material balances are approximately the same as in Example IV. The combined reactor complex, however, of Example IV has the advantage over the process of this example of a greater efficiency of heat utilization, and somewhat greater recovery of sulfur, among other advantages. Even at the temperature employed in reaction (17) some sulfur is distilled. In the combined reactor complex of FIG. 2, all gases go to the sulfur condenser.

Instead of extracting the elemental sulfur with carbon disulfide, it is possible to employ a sulfur still for volatilizing the sulfur. In this case, the temperature required would be somewhat above the boiling point of sulfur (833° F.), and a neutral atmosphere is desired. Oxidizing conditions must be avoided to prevent formation of sulfur dioxide ($SO_2$). Preferably the still would be employed in addition to and after drying of the sulfite. A sulfur condenser also would be employed with the sulfur still, as in Example IV.

EXAMPLE VI

Make-up of calcium sulfide can be obtained by introducing calcium carbonate into the sulfide slurry. Some of the calcium carbonate will react with sulfur dioxide to give calcium sulfite and $CO_2$ in the following reaction:

(19) $\quad CaCO_3 + SO_2 + 2H_2O \rightarrow CaSO_3 \cdot 2H_2O + CO_2$.

The ground limestone does not react completely, but any unreacted limestone with the withdrawn solids will be subsequently calcined to produce calcium oxide, which then is reactive with the sulfur dioxide in the scrubber and fully reacts when returned to the slurry. Preferably, the calcium carbonate is added to the scrubber as a powder.

Calcium oxide and calcium hydroxide can also be employed for make-up, but also should be added in the powder or slurry form. If calcium oxide is used, a lump lime would be satisfactory if slaked, using make-up water, before it is added to the scrubber.

EXAMPLE VII

The following example illustrates the process of the present invention employing a sodium sulfide ($Na_2S$) slurry or solution instead of calcium sulfide. In this case, the scrubbing proceeds according to the equation:

(20) $\quad 2Na_2S + 3SO_2 \rightarrow 2Na_2S_2O_3 + S$

The scrubbing solution was a nearly saturated solution of sodium thiosulfate ($Na_2S_2O_3$), of about 240 grams sodium thiosulfate in 200 ml. of water at 160° F. Sulfur dioxide was bubbled into the solution (200 milliliters) at the rate of 31.8 grams sulfur dioxide per hour. The pH was maintained at about 3.9–4.1 by the addition of 50 grams of hydrated sodium sulfide ($Na_2S \cdot 9H_2O$) in 100 milliliters of water over a period of twenty-seven minutes. Temperature varied between 150–160° F. The batch was filtered and dried at 100° C., the dried solids weighing 3.218 grams. By carbon disulfide ($CS_2$) extraction, 2.73 grams of sulfur were obtained from the solids. Expected yield from Equation 20 is 3.32 grams, representing a recovery of about 82%.

The embodiments of the invention in which an exclusive property or privilege is claimed are defined as follows:

1. A continuous process for removing sulfur dioxide from combustion gases containing small amounts thereof and recovering elemental sulfur comprising the steps of
   (a) continuously passing said gases into intimate contact with a slurry maintained at a temperature in the range of from about 50° to 200° F. and a solution containing an acid soluble alkali or alkaline earth metal sulfide, the pH of the slurry being between about 3.0 and 5.0 to react sulfur dioxide with the metal sulfide to form a precipitate including metal sulfite, metal sulfate, and elemental sulfur;
   (b) continuously withdrawing a portion of the slurry and separating the solids therefrom;
   (c) recycling the saturated solution from the separating step for scrubbing additional combustion gases;
   (d) heating the solids at a temperature of from about 212° to 400° F. to reduce the water content and water of hydration and to convert any metal thiosulfate to additional metal sulfite and elemental sulfur;
   (e) extracting the elemental sulfur from the solids by heating said solid at a first relatively moderate temperature of between about 1100° F. and about 1500° F. to vaporize elemental sulfur therefrom and convert thiosulfate therein to additional metal sulfite and elemental sulfur, said heating also converting metal sulfite therein to metal sulfide and sulfate;
   (f) heating said solids residue from step (e) under reducing conditions in a third heating step at a temperature of between about 1550° F. and about 2100° F. to convert metal sulfite and sulfate therein to metal sulfide; and
   (g) recycling the metal sulfide to scrub additional gas.

2. The process of claim 1 in which said metal sulfide is calcium sulfide.

3. The process of claim 1 wherein a portion of the make-up calcium sulfide is obtained by adding calcium carbonate to the slurry, at least a portion of the carbonate reacting with sulfur dioxide to form calcium sulfite, the remainder of the calcium carbonate being made reactive in the step of reducing the metal sulfite and sulfate to form metal sulfide.

4. The process of claim 1 including the step of condensing said vaporized sulfur of step (e) in a condenser operated at a gas outlet temperature of at least about 300° F.

References Cited

UNITED STATES PATENTS

| | | | |
|---|---|---|---|
| 1,062,120 | 5/1913 | Sanborn et al. | 423—242 |
| 2,052,892 | 9/1936 | Murray | 423—577 X |
| 2,863,732 | 12/1958 | Bowers et al. | 423—577 |
| 2,113,198 | 4/1938 | Nonhebel et al. | 423—242 |

GEORGE O. PETERS, Primary Examiner

U.S. Cl. X.R.

423—242, 512, 551, 554